United States Patent
Lee

(10) Patent No.: US 8,632,909 B2
(45) Date of Patent: Jan. 21, 2014

(54) SHEATH FOR ENCLOSING A POUCH OF A SECONDARY BATTERY

(75) Inventor: Sang-Ho Lee, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1071 days.

(21) Appl. No.: 11/407,350

(22) Filed: Apr. 20, 2006

(65) Prior Publication Data

US 2006/0263681 A1  Nov. 23, 2006

(30) Foreign Application Priority Data

Apr. 27, 2005 (KR) ........................ 10-2005-0035291

(51) Int. Cl.
*H01M 2/04* (2006.01)

(52) U.S. Cl.
USPC ........................................ 429/176; 429/163

(58) Field of Classification Search
USPC ................................................. 429/163, 176
See application file for complete search history.

(56) References Cited

U.S. PATENT DOCUMENTS

| | | | |
|---|---|---|---|
| 6,225,778 B1 | | 5/2001 | Hayama et al. |
| 6,255,015 B1 | * | 7/2001 | Corrigan et al. ............. 429/149 |
| 6,451,474 B1 | * | 9/2002 | Kozu et al. .................... 429/100 |
| 7,262,956 B2 | * | 8/2007 | Suzuki et al. ............ 361/679.01 |
| 7,682,734 B2 | * | 3/2010 | Jeon .............................. 429/163 |
| 2003/0165736 A1 | * | 9/2003 | Hiratsuka ..................... 429/153 |
| 2004/0048149 A1 | | 3/2004 | Gross et al. |
| 2005/0017678 A1 | * | 1/2005 | Hiratsuka et al. ............. 320/112 |
| 2005/0164080 A1 | * | 7/2005 | Kozu et al. .................... 429/176 |
| 2005/0221188 A1 | * | 10/2005 | Takami et al. ........... 429/231.95 |
| 2006/0216591 A1 | | 9/2006 | Lee |
| 2006/0283008 A1 | | 12/2006 | Hiratsuka et al. |
| 2007/0154794 A1 | | 7/2007 | Kim et al. |
| 2008/0124624 A1 | | 5/2008 | Lin |
| 2010/0035145 A1 | | 2/2010 | Kim et al. |

FOREIGN PATENT DOCUMENTS

| | | |
|---|---|---|
| EP | 1096589 A1 | 5/2001 |
| EP | 1473785 A2 | 11/2004 |
| EP | 1 524 709 A2 | 4/2005 |
| JP | 2001-319633 | 11/2001 |
| JP | 2004165134 | 6/2004 |
| KR | 20-1999-006549 | 2/1999 |
| KR | 10-2005-0036632 | 4/2005 |
| KR | 1020050032199 A | 4/2005 |
| KR | 1020050074201 A | 7/2005 |
| WO | WO 03049213 A1 * | 6/2003 ............. H01M 2/10 |

OTHER PUBLICATIONS

"Sheath." WordNet Search 3.0. May 3, 2010. http://wordnetweb.princeton.edu/perl/webwn?s=sheath.*
Definition for "Foil" print out from -Merriam Webster on Jun. 10, 2010 http://unabridged.merriam-webster.com/cgi-bin/Third.
European Search Report issued by European Patent Office on Feb. 24, 2009 corresponding to Korean Patent Application No. 2005-0035291.

* cited by examiner

*Primary Examiner* — Zachary Best
(74) *Attorney, Agent, or Firm* — Robert E. Bushnell, Esq.

(57) ABSTRACT

A secondary battery includes an electrode assembly having first and second electrodes and a separator, a pouch type case for receiving the electrode assembly, and a sheath for enclosing outer sides of the case. The sheath can prevent damage to the pouch in electronic devices to which the secondary battery is applicable as an inner pack type.

6 Claims, 4 Drawing Sheets

SHEATH FOR ENCLOSING A POUCH OF A SECONDARY BATTERY

CROSS-REFERENCE TO RELATED APPLICATION

This application claims priority to and the benefit of Korean Patent Application No. 10-2005-0035291, filed Apr. 27, 2005, the entire content of which is incorporated herein by reference.

BACKGROUND OF THE INVENTION

1. Field of the Invention

The present invention relates to a secondary battery, and more particularly to a pouch type lithium secondary battery which has an electrode assembly received in a pouch.

2. Description of the Prior Art

Secondary batteries use a non-aqueous electrolyte because of the reactivity between lithium and water. The non-aqueous electrolyte may be a solid polymer containing lithium salts, or liquid in which lithium salts are dissociated from organic solvent.

The secondary batteries can be classified, according to the kind of electrolyte, into a lithium metal battery and a lithium ion battery which use a liquid electrolyte, and a lithium ion polymer battery using polymer solid electrolyte.

In complete solid type lithium ion polymer batteries, there is no problem of leakage of the organic electrolyte. In gel type lithium ion polymer batteries containing organic electrolyte, the leakage of the electrolyte also can be easily prevented in comparison with lithium ion batteries using liquid electrolyte. For example, the lithium ion polymer battery may use a pouch as a case for an electrode assembly, instead of a metal can.

The pouch is made of multi-layer film generally having a metal foil layer and a synthetic resin layer covering the metal foil layer. The pouch makes it possible to remarkably reduce the weight of the battery, in comparison to when the metal can is used as the case for the electrode assembly. In the multi-layer pouch, the foil is generally made of an aluminum material. The polymer layer forming an inner layer of the pouch protects the metal foil from the electrolyte, and prevents an electric short-circuiting between anode and cathode, and electrode tabs.

In order to form a pouch type lithium secondary battery, first, an anode plate, a separator, and a cathode plate are sequentially stacked and then rolled so as to form an electrode assembly. Next, the electrode assembly is disposed in a fitted pouch. Then, upper and lower pouch films are heated and fusion-welded at open edge of the pouch so as to seal the pouch, thereby forming the pouch type bare cell battery.

Such a bare cell battery may form an inner pack type battery. The inner pack type battery refers to a battery like a bare cell battery which is directly inserted into the body of an electronic device such as a digital camera or a digital camcorder requiring the secondary battery and which is then covered with a cover member forming an exterior surface of the electronic device. The inner pack type battery has an excellent merit of enduring exterior impact.

Specifically, elements or structure, such as a protection circuit module connected to the electrodes of the bare cell battery, or a positive temperature coefficient element, is mounted in the body of the electronic device.

Therefore, in the case of the inner pack type secondary battery in which a protection circuit module, a positive temperature coefficient element, etc. are mounted in a body of an electronic device, just the protection circuit module can be replaced with a new module when a protection circuit is damaged. Therefore, the inner pack type secondary battery has an improved yield and a less chance of being exposed to exterior impact, in comparison with the secondary battery integrated with the protection circuit module.

However, the conventional secondary battery where the electrode assembly is received in the soft pouch has a problem in that a soft pouch may be easily damaged during mounting of the secondary battery in the electronic device.

SUMMARY OF THE INVENTION

Accordingly, the present invention has been made to solve the above-mentioned problems occurring in the prior art, and an object of the present invention is to provide a secondary battery which includes a sheath for enclosing the outside of a pouch, thereby preventing a soft pouch from being damaged.

In order to accomplish the object of the present invention, there is provided a secondary battery which comprises: an electrode assembly comprising a first electrode plate, a second electrode plate, and a separator interposed between the first electrode plate and the second electrode plate; a pouch having a case for receiving the electrode assembly; and a sheath for enclosing the pouch. Preferably, the sheath encloses sides of the pouch in rounding.

According to an aspect of the present invention, the sheath is preferably formed with material having a mechanical strength higher than that of material forming the case, in order to reinforce the strength of the case. The sheath may be made of stainless steel, so as to be formed as a foil. Furthermore, the sheath may be made of synthetic resin. In addition, the sheath has a thickness of less than 0.1 mm.

According to still an aspect of the present invention, the sheath has a lower surface portion which is in contact with a lower surface of the pouch, side surface portions which are in contact with a side surface of the pouch, and upper surface portions which are in contact with an upper surface. Further, the side surface portions of the sheath are formed at both edges of the lower surface portion of the sheath, and the upper surface portions of the sheath are connected to the side surface portions around the lower surface portion of the sheath. Further, the lower surface portion of the sheath has an area corresponding to that of the lower surface of the pouch, and the side surface portions of the sheath have an area corresponding to that of the side surface of the pouch.

According to yet an aspect of the present invention, the sheath includes a lower surface portion which is in contact with a lower surface of the pouch, side surface portions which are in contact with side surfaces of the pouch, respectively, upper surface portions which are in contact with an upper surface of the pouch, and a rear surface portion which is in contact with a rear surface of the pouch. Here, the rear surface portion of the sheath has an area corresponding to a rear surface of the pouch, and is integrated with the lower surface portion of the sheath.

According to still yet an aspect of the present invention, the sheath includes a first side sheath and a second side sheath which cover both sides of the pouch respectively. Here, the left side sheath and the right side sheath respectively have a lower surface portion which is in contact with a lower surface of the pouch, a side surface portion which is in contact with a side surface of the pouch, and an upper surface portion which is in contact with an upper surface of the pouch, the lower surface portion and the upper surface portion of each of the left side sheath and the right side sheath have areas corresponding to half areas of the lower surface and the upper surface of the pouch respectively. Furthermore, each of the left side sheath and the right side sheath further has a rear surface portion which is in contact with the rear portion of the pouch. Each of the left side sheath and the right side sheath are integrally formed by molding.

According to a further aspect of the present invention, the sheath includes an upper sheath and a lower sheath which are coupled to each other to cover an upper portion and a lower portion of the pouch. Here, the upper sheath has an upper surface portion which is in contact with an upper surface of the pouch and side surface portions which are formed at both edges of the upper surface thereof so as to contact side surfaces of the pouch, and the lower sheath has a lower surface portion which is in contact with a lower surface of the pouch and side surfaces of the pouch which are formed at both edges of the lower surface thereof so as to contact of a lower surface of the pouch. The upper sheath and the lower sheath further have a rear surface portion which is in contact with a rear surface of the pouch respectively. Further, each of the upper and lower sheaths is integrally formed by molding.

According to another aspect of the present invention, the sheath has information including either a serial number of the secondary battery or the manufacturer, which is printed on an exterior surface thereof.

According to yet an aspect of the present invention, the secondary battery is an inner pack battery.

According to still another aspect of the present invention, a secondary battery includes: an electrode assembly comprising a first electrode plate having a first electrode tab, a second electrode plate having a second electrode tab, and a separator interposed between the first electrode plate and the second electrode plate; a pouch having a case receiving the electrode assembly; and a sheath covering at least sides of the pouch. The sheath may further enclose a rear surface of the pouch which is opposite to a front surface from which the first and second electrode tabs extend. The sheath may be a single sheath which is rolled over the pouch or composed of a first sheath and a second sheath each which cover a half of the pouch to cover the pouch.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Hereinafter, a secondary battery according to the present invention will be described with reference to the accompanying drawings.

Figure 1:
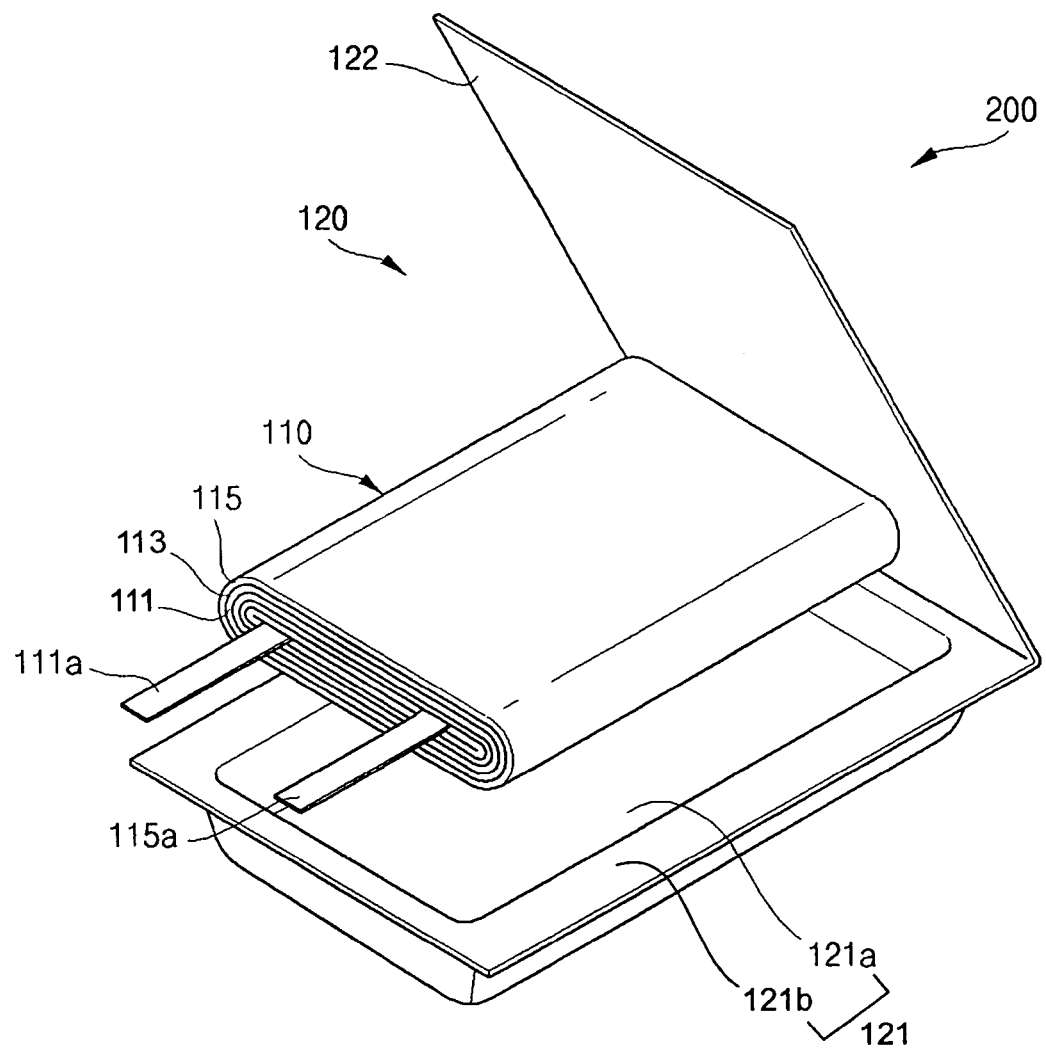
FIG. 1 is an exploded perspective view showing a secondary battery having an electrode assembly and a pouch.
Figure 2A:
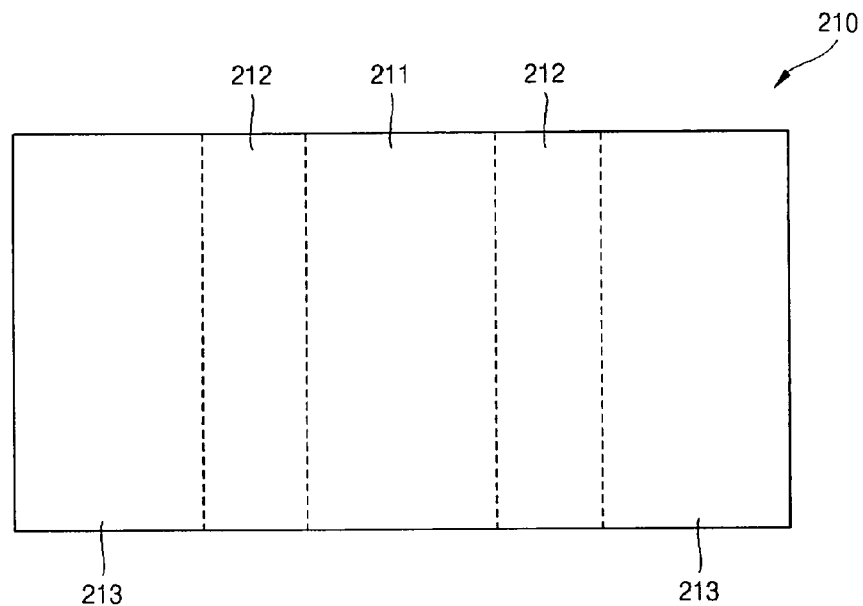
FIG. 2A is a plan view showing a sheath for a pouch according to an embodiment of the present invention.
Figure 2B:
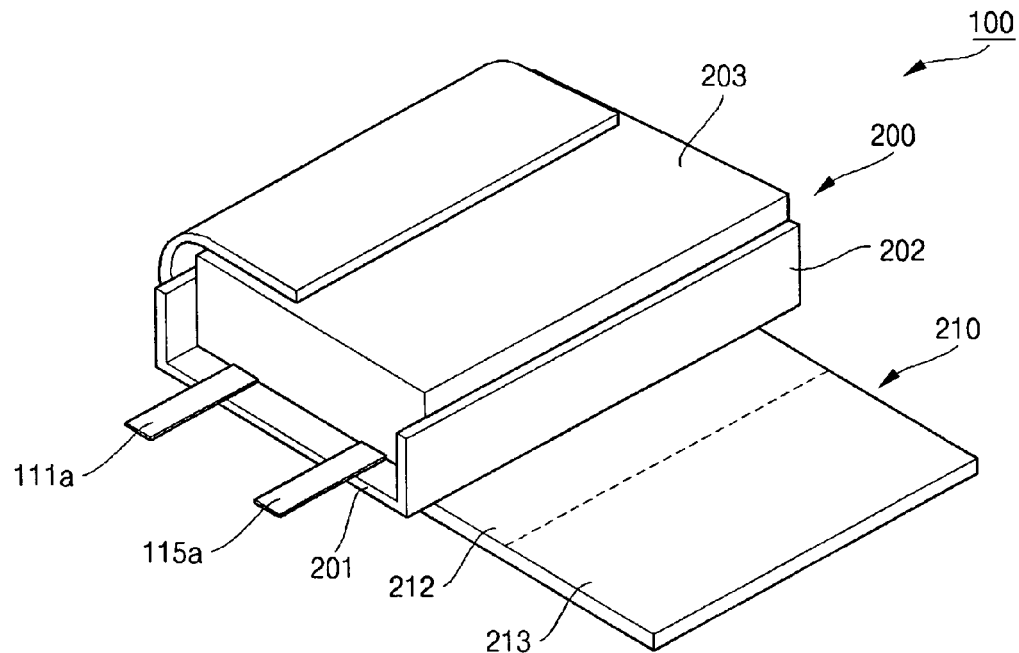
FIG. 2B is a perspective view showing the sheath and the pouch of FIG. 2A.
Figure 6:
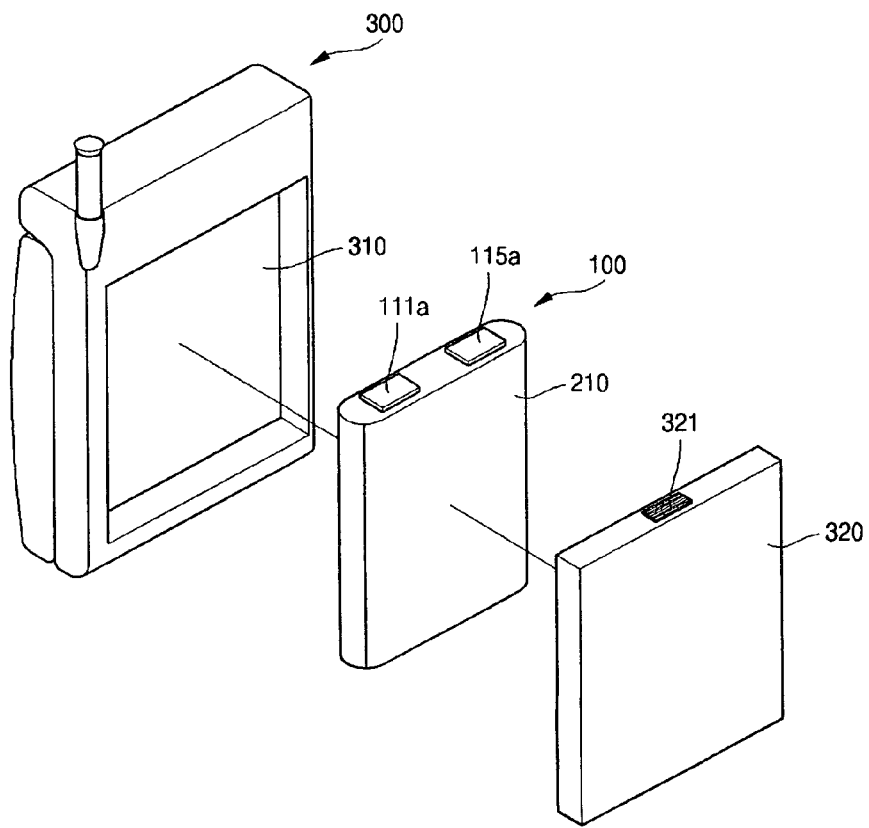
FIG. 6 is an exploded perspective view showing an electronic device to which a secondary battery according to the present invention is applied.

FIG. 1 is an exploded perspective view showing a secondary battery having an electrode assembly and a pouch. FIG. 2A is a plan view showing a sheath for a pouch according to an embodiment of the present invention. FIG. 2B is a perspective view showing the sheath and the pouch of FIG. 2A. FIG. 6 is an exploded perspective view showing an electronic device to which a secondary battery according to the present invention is applied.

Referring to FIGS. 1, 2A and 2B, the lithium secondary battery 100 according to the embodiment of the present invention includes an electrode assembly 110, a pouch 200 having a case 120 in which the electrode assembly 110 is received, and a sheath 210 for enclosing the pouch 200.

The electrode assembly 110 includes first and second electrode plates 111 and 115 coated with first and second active material layers (not shown), and a separator 113 interposed between the first and second electrode plates 111 and 115 so as to prevent an electric short-circuiting between the first and second electrode plates 111 and 115 as well as to allow only the movement of lithium ions. The electrode assembly 110 is rolled several times. The first and second electrode plates 111 and 115 have first and second electrode tabs 111a and 115a coupled thereto, respectively. The first electrode plate 111 may form an anode plate, and the second electrode plate 115 form a cathode plate. In this case, the anode plate 111 is made of an aluminum material, and the cathode plate 115 is made of an copper material. On the other hand, the separator 113 is generally made of polyethylene resin or polypropylene resin. However, the present invention does not limit the material of these elements to those mentioned above.

Chalcogenide compounds, for example composite metal oxides such as $LiCoO_2$, $LiMn_2O_4$, $LiNiO_2$, $LiNiO_2$, $LiNi_{(1-x)}Co_xO_2$ (0<x<1), and $LiMnO_2$, are used as the anode active material. Carbon-based materials, Si, Sn, Tin oxide, composite tin alloys, transition metal oxide, and lithium metal oxide, etc. are used as the cathode active material.

The case 120 includes a first region 121 having a recess 121a with a predetermined depth in order to receive the electrode assembly 110 and a flange member 121b, and a second region 122 with an area enough to cover the recess 121a of the first region 121. The case 120 is made of a pouch film in which an adhesive layer is coated on one surface of an aluminum foil and an insulation layer is coated on the other surface of the aluminum foil. The adhesive layer is formed with denaturalized polypropylene resin such as casted polypropylene (CPP) resin, and the insulation layer is made of synthetic resin such as nylon or polyethyleneterephtalate (PET). However, the present invention does not limit the material of the case 120 to those mentioned above.

Further, the recess 121a of the pouch is formed with a predetermined depth, while the first and second electrode tabs 111a and 115a connected to the electrode assembly 110 extend at a desired distance outward from an edge of the case 120, i.e. the flange member 121b.

The sheath 210 has a lower surface portion 211 that is in contact with a lower surface 201 of the pouch 200, side surface portions 212 that is in contact with side surfaces 202 of the pouch 200 respectively, and an upper surface portion 213 that is in contact with an upper surface 203 of the pouch 200. The sheath 210 is formed in such a manner that both side surface portions 212 are connected to both edges of the lower surface 211 respectively, and the upper surface portions 213 are respectively formed at a side of each of the side surface portions 212 around the lower surface portion 211. The lower surface portion 211 has an area corresponding to that of the lower surface of the pouch 200, while the side surface portions 212 have an area corresponding to that of the side surface of the pouch 200. Further, the upper surface portions 213 formed at both edges of the lower surface portion 211 have a total area corresponding to an area of the upper surface of the pouch 200. In addition, the sheath 210 encloses the sides of the case 120 from the lower surface to the side surfaces of the case 120 in rounding. Specifically, the sheath 210 of the case 120 makes the case 120 have rounded sides, so as to reduce the contact area of the case with the electronic device, thereby facilitating insertion and separation of the case 120 in and from the electronic devices when the case 120 is inserted into and separated from the electronic devices.

The sheath 210 is adhered to the case 120 by a separate adhesive so as to completely enclose the exterior surface of the case 120, thereby reinforcing the strength of the pouch 200. Therefore, the sheath 210 is made of a material having a mechanical strength higher than that of material for the case 120, for example stainless steel or synthetic resin. Further, the sheath 210 is preferably formed as a foil. Furthermore, the sheath 210 is preferably formed with a thickness of less than 0.1 mm. When the sheath 210 has a thickness of more than 0.1 mm, the pouch has a reduced inner volume due to the thickness increase of the sheath 210 within the predetermined entire volume, so that the capacity of the secondary battery is remarkably reduced.

On the other hand, the sheath 210 may have information relating to one of a serial number, manufacturing data, and manufacturer of the secondary battery, printed on the exterior surface thereof.

The first and second electrode tabs 111a and 115a extending outward from the case 120 protrude outward from the sheath 210. The first and second electrode tabs 111a and 115a which protrude outward are connected to a protection circuit board (not shown) which is mounted outside of the secondary battery, i.e. in the electronic device.

The electronic device may be a portable mobile phone 300.

The portable mobile phone 300 is provided at a side thereof with a battery mounting portion 310 having a desired space in which the secondary battery is inserted, and a cover 320 for covering the exterior surface of the battery mounting portion 210. The cover 320 has a fixing button 321 installed thereto so as to fix the cover 320 to the portable mobile phone 300. The portable mobile phone 300 is provided with the protection circuit board, which is connected to the first and second electrode tabs 111a and 115a of the secondary battery 100, mounted around the battery mounting portion 310 in the portable mobile phone 300.

Hereinafter, the sheath according to another embodiment of the present invention will be described.

Figure 3:
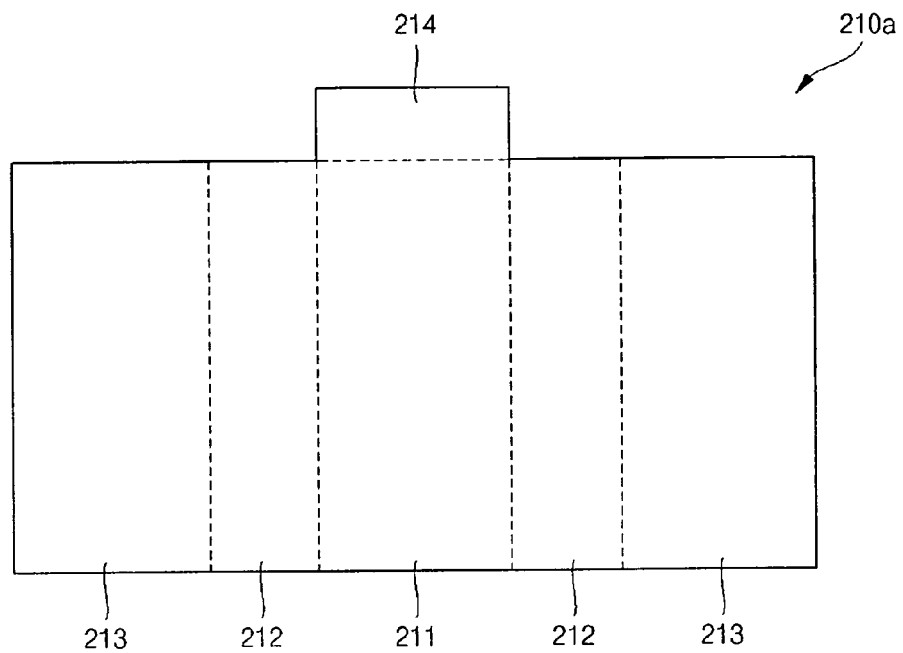
FIG. 3 is a plan view showing a sheath according to another embodiment of the present invention.

FIG. 3 is a plan view showing the sheath according to another embodiment of the present invention. The same reference numerals are used to denote the same part of the sheath 210a of the present embodiment as that of the sheath 210 according to the embodiment of FIG. 2A, and the description relating to the same parts will be omitted.

Referring to FIG. 3, the sheath 210a according to another embodiment of the present invention has a lower surface portion 211, side surface portions 212, upper surface portions 213, and a rear surface portion 214. The rear surface portion of the sheath 210a may be formed at an edge of the lower surface portion 211 so as to extend perpendicular to the side surface portions 212. The rear surface portion 214 has an area corresponding to the rear surface of the pouch 200 which is opposite to a front surface through which the first and second electrode tabs 111a and 115a extends outward, and comes into complete contact with the rear surface of the pouch 200, so as to reinforce the strength of the rear surface of the pouch 200. The rear surface portion 214 is integrated with the lower surface portion 211 of the sheath 210a, or formed separately from the lower surface portion 211 and attached to the lower surface portion 211 of the sheath 210a.

Hereinafter, the sheath according to another embodiment of the present invention will be described.

Figure 4:
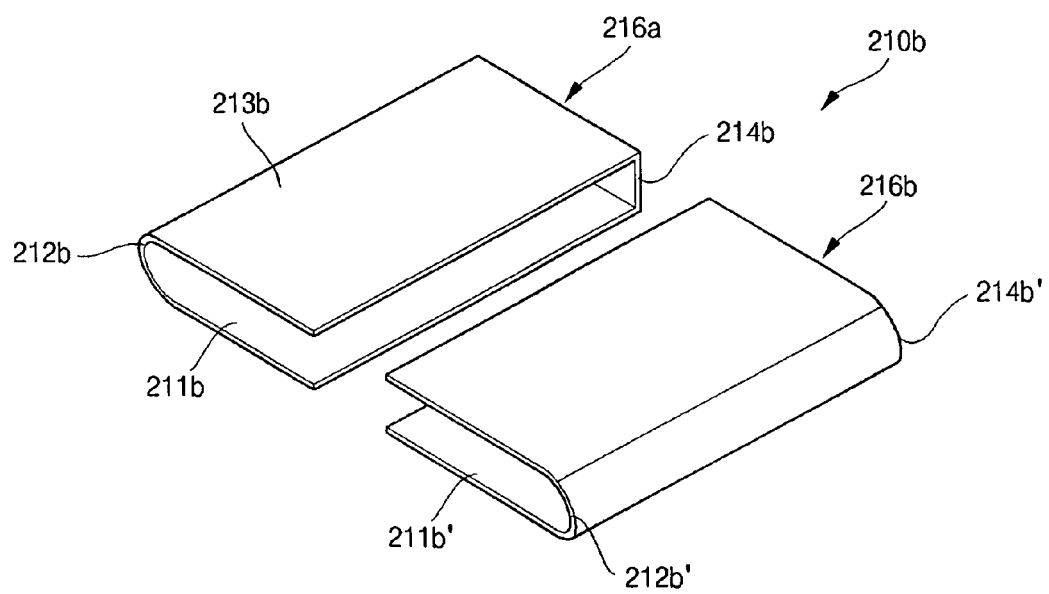
FIG. 4 is a perspective view showing a sheath according to still another embodiment of the present invention.

FIG. 4 is a perspective view showing the sheath according to another embodiment of the present invention. The same reference numerals are used to denote the same part of the sheath of the present embodiment as that of the sheath according to the embodiment of FIG. 2A, and the description relating to the same parts will be omitted.

Referring to FIG. 4, the sheath 210b includes a left side sheath 216a and a right side sheath 216b, which are assembled with each other at both sides of the pouch 200 and reinforce the strength of the pouch 200. Therefore, the left side sheath 216a and the right side sheath 216b have open sides which are opened to opposite sides of the pouch, respectively. The left side sheath 216a and the right side sheath 216b respectively have a lower surface portion 211b and 211b', a side surface portion 212b and 212b', and an upper surface portion 213b and 213b'. The lower surface portion 211b and 211b' and the upper surface portion 213b and 213b' respectively have an area corresponding to a half area of an upper surface or a lower surface of the pouch 200. Further, each of the side surface portions 212b and 212b' of the left side sheath 216a and the right side sheath 216b has an area corresponding to a side surface of the pouch 200. Further, each of the left side sheath 216a and the right side sheath 216b further has a rear surface portion 214b and 214b' formed with an area corresponding to a half area of the rear surface of the pouch 200. Preferably, each of the left side sheath 216a and the right side sheath 216b forming the sheath 210b may be integrally formed by molding. The left side sheath 216a and the right side sheath 216b respectively cover the pouch 200 and adhere to the pouch 200 by a separate adhesive.

Hereinafter, a sheath according to another embodiment of the present invention will be described.

Figure 5:
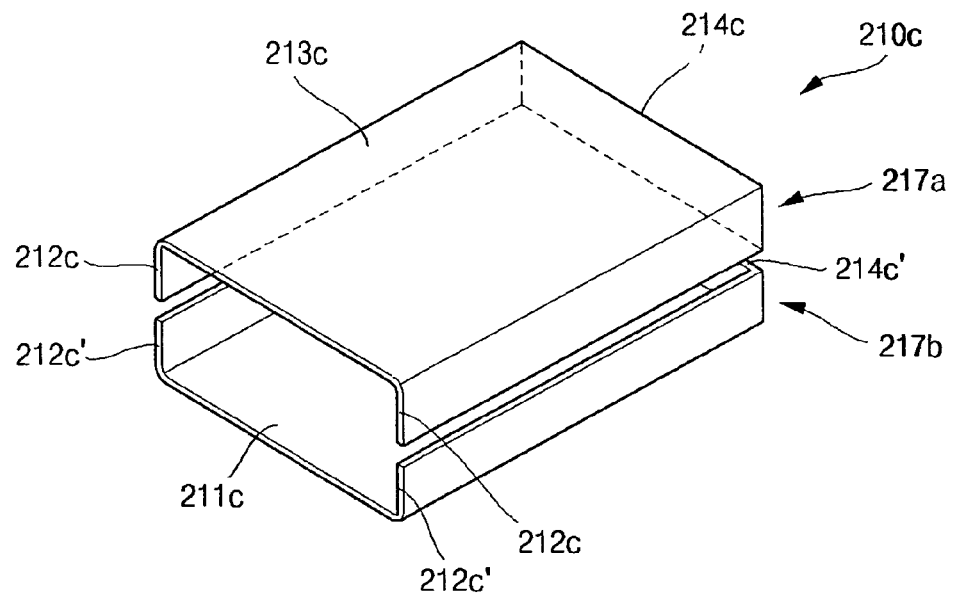
FIG. 5 is a perspective view showing a sheath according to yet another embodiment of the present invention.

FIG. 5 is a perspective view showing the sheath according to another embodiment of the present invention. The same reference numerals are used to denote the same part of the sheath of the present embodiment as that of the sheath according to the embodiment of FIG. 2A, and the description relating to the same parts will be omitted.

Referring to FIG. 5, the sheath 210c according to another embodiment of the present invention includes an upper sheath 217a and a lower sheath 217b, which are coupled to cover the pouch 200 from sides of the pouch 200 so as to completely reinforce the strength of the pouch 200. The coupled upper sheath 217a and lower sheath 217b make an opening that open toward the front surface of the pouch 200. Further, the upper sheath 217a has an upper surface portion 213c, and side surface portions 212c formed at both edges of the upper surface portion 213c. The lower sheath 217b includes a lower surface portion 211c and side surface portions 212c' formed at both edges of the lower surface portion 211c. The upper and lower surface portions 213c and 211c respectively have an area corresponding to that of a lower surface or an upper surface of the pouch 200. Each of the upper sheath 217a and the lower sheath 217b further includes a rear surface portion 214c formed with an area corresponding to that of a rear surface of the pouch 200. Preferably, each of the upper and lower sheaths 217a and 217b forming the sheath 210c may be integrally formed by molding. The upper and lower sheaths 217a and 217b are coupled to upper and lower sides of the pouch 200, respectively, and adhere to the pouch 200 by a separate adhesive.

Hereinafter, the operation of the secondary battery according to the present invention constructed as described above will be described.

The electrode assembly 110 is inserted into the recess 121a of the pouch 200. The pouch 200 receiving the electrode assembly 110 is enclosed with the sheath 210, of which both sides are rounded. The first and second electrode tabs 111a and 115a are protruded from a front side of the sheath 210 and electrically connected to the protection circuit board, so as to form the secondary battery.

Since the sheath 210 enclosing the exterior surface of the case 120 has sides formed in rounding, the pouch 200 makes a smooth contact with the contact surface of the battery mounting portion 310 when the secondary battery 100 is mounted in the battery mounting portion 310. Further, the contact surface between the sides of the pouch 200 and the inner surface of the battery mounting portion 310 is reduced to make it possible to facilitate attachment and detachment of the secondary battery 100. Furthermore, the sheath 210 made of stainless steel or synthetic resin, etc. encloses the exterior surface of the case 120, thereby preventing damage to the soft case 120. Here, the secondary battery 100 is mounted in a portable mobile phone so that the first and second electrode tabs 111a and 115a are connected to the protection circuit board mounted adjacent to the battery mounting portion 310.

When the secondary battery 100 is mounted in the battery mounting portion 310 of the portable mobile phone 300, the cover 320 is fixed to the portable mobile phone 300 by the fixing button 321, so as to cover the battery mounting portion 310.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A secondary battery comprising:
    an electrode assembly comprising a first electrode plate, a second electrode plate, and a separator interposed between the first electrode plate and the second electrode plate;
    a pouch having a case for receiving the electrode assembly; and
    a sheath for enclosing the pouch, the sheath having a sheet shape and including
    a lower surface portion covering a lower surface of the pouch;
    a first side surface portion connected to one side edge of the lower surface portion and covering a first side portion of the pouch;
    a second side surface portion connected to the other side edge of the lower surface portion and covering a second side portion of the pouch;
    a first upper surface portion bounded by one end of the sheath, two side edges of the sheath and one side surface portion of the sheath connected to the first side surface portion and covering a portion of the area of an upper surface of the pouch; and
    a second upper surface portion bounded by one end of the sheath, two side edges of the sheath and one side surface portion of the sheath connected to the second side surface portion and substantially covering the remaining area of the upper surface of the pouch;
    wherein the total area of the first and second upper surface portions of the sheath is approximately the same as the area of the upper surface of the pouch,
    and an end of the first upper surface portion is disposed adjacent to an end of the second upper surface portion on the upper surface of the pouch;
    wherein the sheath further comprises a rear surface portion connected at an edge of the lower surface portion for covering a rear portion of the pouch.

2. The secondary battery as claimed in claim 1, wherein all the surface portions of the sheath are one continuous piece.

3. The secondary battery as claimed in claim 1, wherein the sheath has the information printed on an exterior surface thereof and including the data related to the secondary battery.

4. The secondary battery as claimed in claim 1, wherein the secondary battery is an inner pack type battery.

5. The secondary battery as claimed in claim 1, wherein the sheath has a mechanical strength higher than that of the pouch.

6. The secondary battery as claimed in claim 5, wherein each of the first and second side surface portions has rounded sections corresponding to a section of the side portion of the pouch.

* * * * *